Patented Aug. 22, 1950

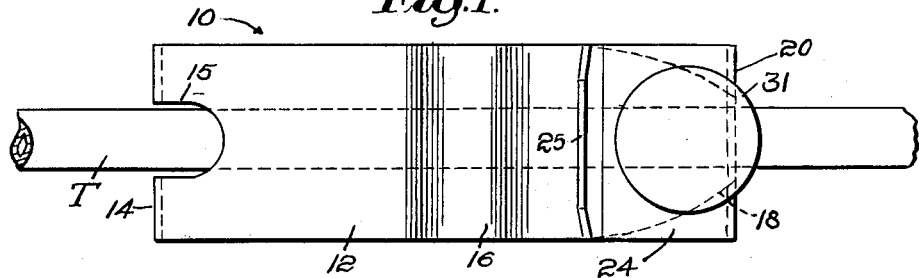
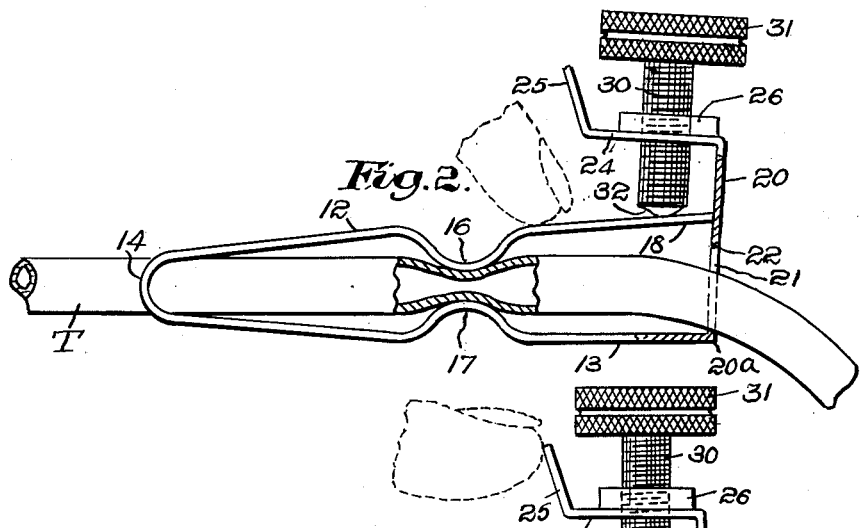
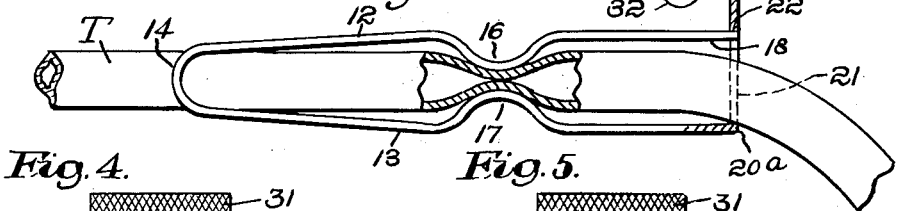
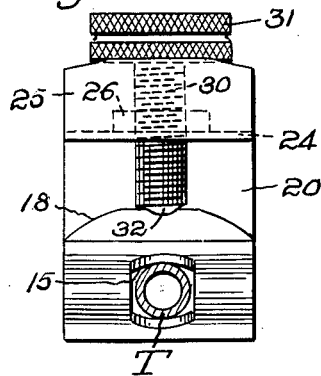
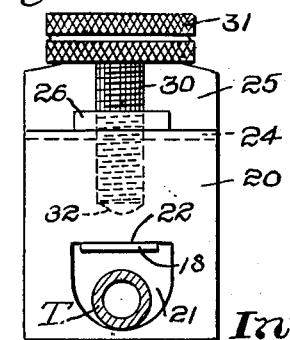

2,519,909

UNITED STATES PATENT OFFICE 2,519,909

TUBE VALVING CLAMP

James W. Johnson, Woburn, Mass., assignor to Macalaster Bicknell Company, Cambridge, Mass., a corporation of Massachusetts Application October 31, 1946, Serial No. 707,002

1 Claim. (Cl. 251—5)

This invention relates to flow control means for flexible tubing. It aims to provide an easily manipulated device in the nature of a valving clamp or pinch-cock having capacity for adjustment for different flow rates between a minimum which may be a controlled drip and a full flow maximum together with provision for instant complete shut-off and also for ready return to the same flow-controlling setting as prior to the shutting off action. While the improved clamp devices of the invention are useful for regulating fluid flow in flexible tubing generally, they are particularly applicable to hospital and laboratory techniques, as in administering intravenous injections and blood transfusions, and in blood banking and other practice where an accurately controlled flow rate and capacity for instant or emergency shut-off are important.

In the drawings illustrating by way of example one embodiment of the invention:

Fig. 1 is a top plan of a clamp or pinch-cock as installed on a length of flexible tubing;

Fig. 2 is a side elevation of the device of Fig. 1 set to an intermediate flow-controlling position, the tubing being partly open;

Fig. 3 is a similar side elevation but with the clamp positively locked in full shut-off position; and Figs. 4 and 5 are opposite end elevations of the device, Fig. 4 showing the parts in a controlled-flow setting as if looking from the left at Fig. 2 and Fig. 5 illustrating the shut-off position as viewed from the right in Fig. 3.

In Fig. 1 a valving clamp, clip or pinch-cock of the invention, designated generally at 10, is shown installed on a length of flexible tubing T in which the fluid flow is to be controlled. Such tubing may be of rubber, rubberous or like material including the various synthetics suitable for that purpose. As will be apparent from the description and drawings the clamp 10 and tubing T are readily assembled by threading the tubing longitudinally through the clamp and sliding the latter along to the appropriate position, generally near the discharge end of the tubing. The clamps 10 may be supplied in different sizes according to the diameter of the particular tubing. They are integrally fabricated from resilient sheet or strip material preferably of a corrosion resistant character. Suitable stocks include Phosphor spring bronze, a plated or stainless steel and other appropriately stiff but resilient composition. For the smaller tubing sizes up to ⅜ in. O. D. or thereabouts a spring metal stock of the order of 24 B. and S. gauge is generally satisfactory, a somewhat heavier grade being suitable for larger sizes.

The stock strip of appropriate length and width is bent and shaped to the general elongated V-form of Figs. 2 and 3. The two legs of the V are approximately co-extensive, generally similar and oppositely arranged. For convenience in description one leg will be referred to as the inner or top leg 12 and the other as the outer or bottom leg 13, these terms being understood as conveying no limitation to any particular position of the device in use. The legs 12 and 13 are constituted as double levers, mutually fulcrumed at the closed or narrow end of the V where the integrally joined parts form a flexure hinge 14. The rounded end wall of the hinge is centrally formed with a tube-receiving and guiding aperture 15; see Figs. 1 and 4. The flow-controlling work is effected at an intermediate position along the legs 12, 13. There the legs are formed with opposed and inwardly rounded transverse ribs or jaws 16, 17 adapted for compressive movement toward each other about the flexure hinge 14, the opposed rib pair defining a jaw-like section for pinching coaction with a tubing threaded between them lengthwise of the clamp. The inherent resiliency of the strip material in the region of the hinge 14 biases the jaws 16, 17 in the opening direction.

The portions of the legs 12, 13 beyond the jaw formation 16, 17 toward the wide end of the V provide a lever-like manipulating portion for the clamp and carry the means for variably setting it to regulate the flow in the tubing. One of the legs, herein that referred to as the outer or bottom leg 13, has a lateral extension or end wall 20 standing at approximately right angles to said leg 13 and projecting laterally or upwardly past the adjacent end 18 of the other or top leg 12. Laterally beyond the top leg 12 the end wall 20 is inturned substantially perpendicularly to provide a shelf or flange 24 overhanging the end 18 of the leg 12 and terminating in an upturned nose or finger piece 25. The end wall 20 and flange 24 together form a lateral and reverse extension of the outer or bottom leg 13 encompassing the adjacent end 18 of the other leg 12.

The end wall 20 and associated parts in cooperation with the legs 12, 13 provide a combined latch and screwpress element or head whereby the accurate flow regulation and optional quick shut-off are accomplished. As previously noted the clamp 10 is installed by threading it lengthwise onto the tubing, passing the latter through the aperture 15 at the hinged end 14 and between the pincers or jaw members 16, 17. The opposite end wall 20 also is formed with an opening or recess 21 for passage of the tubing, see particularly Fig. 5, this recess being in general alignment with the aperture 15 at the hinged end of the clamp and with the jaw members 16, 17. As best seen in Fig. 5 the upper edge 22 of the recess 21 extends laterally of the clamp centrally opposite to the adjacent end 18 of the top leg 12, said end being laterally reduced or rounded as seen in Figs. 1 and 5, for coaction with the end wall 20 and reception in the recess 21 thereof. Said upper edge 22 of the end recess 21 defines a latch, keeper or detent for down-holding engagement with the clamp leg 12.

This latch formation 22 is located with reference to the end 18 of the top leg 12 and to the jaws 16, 17 so as to snap over and lock down the leg end 18 when the jaws 16, 17 are in maximum closed position, for completely shutting off all flow in the tubing, see Fig. 3. The arrangement and proportioning of the parts may be such that in the absence of tubing between the legs and with the leg end 18 locked into the recess 21 the jaws 16, 17 are compressed into actual or approximate abutting relation. Hence with the clamp installed for use on a length of tubing and with the jaws in the closed and locked position of Fig. 3 the walls of the tubing are pinched together into fully closed relation insuring shut-off of the flow. The resiliency of the clamp legs 12, 13 is adequate to accommodate the compressed thickness of the tubing wall in the closed and locked position of Fig. 3, the leg portions between the pinching section 16—17 and the end wall 20 flexing inward to any extent necessary for snapping the leg end 18 and the latch 22 into mutual interlocked engagement. The load imposed by the pinched wall of the tubing tends to retain the parts in the Fig. 3 locked position.

In this connection it is to be noted that the end wall 20 itself has a flexure hinge relation at its juncture 20a with the outer or bottom leg 13 on which it is carried. Further, this end wall 20 is spring biased in the direction toward the narrow end 14 of the V, toward the left in Figs. 1 to 3. Cooperatively the top leg 12 is dimensioned to bring the end 18 thereof past the normal upright plane of the end wall 20, at least in the compressed position of the legs, thereby affording the snap locking action as referred to. That is, noting particularly Fig. 2, the leg end 18 is adapted to engage and thrust outwardly against the inner face of the end wall 20 above the latch 22 as the two legs 12, 13 are forced together compressively from an open or partly open position as in Fig. 2 toward and into the full closed and locked position of Fig. 3. In Fig. 2 the end wall 20 is flexed outwardly, toward the right, about its base hinge at 20a. In Fig. 3 the locking end 18 of the leg 12 has been depressed to the level of the latch 22, and the end wall 20 has snapped over and into holding relation to it.

As previously indicated the clamp combines with the shut-off lock variable setting means of such character that the rate of flow in the tubing may be regulated with extreme accuracy. In some uses, such as in intravenous injections, a calculated restricted flow rate is important, desirably with capacity for accurate regulation down to a drip flow at a predetermined number of drops per time interval. In accordance with the invention accurate micro-flow-control, is had through screw-press means integrally incorporated in the simplified unitary clamp 10 and operatively combined with the shut-off lock already described.

For this purpose the inturned flange 24 of the end wall 20 is provided with a screw-threaded formation opposite the end 18 of the top leg 12. While such formation may be variously constructed, in the interest of precision the flange 24 as shown is furnished with a tapped bushing 26 set in an aperture in the flange and firmly secured as by clinching or welding to the latter. The threaded bushing 26 operatively receives a regulating presser and stop screw 30 having a knurled head 31. The foot or inner end of the regulating screw 30 desirably is rounded or ball pointed as at 32 to facilitate micro-setting of the parts, and to insure accurate return engagement in the selected flow-controlling position such as that of Fig. 2 after a shift to the shut-off condition of Fig. 3. The lead and pitch of the threads of the screw 30 and of the screw-receiving formation 26 provide regulatory setting of the clamp such that the flow-valving action may be varied through extremely fine increments, giving any desired flow rate between a maximum for the given tube and a minimum which may be a controlled drip.

From the foregoing description in connection with the drawings, it will be apparent that the valving clamp 10 of the invention provides simple and readily manufactured means of improved efficiency for the purposes stated. Referring to Fig. 2, assume that the device has there been set for a desired reduced rate of flow in the tubing T, by appropriate adjustment of the control screw 30 of the screw-press means. At any instant the flow may easily be shut off in the manner as indicated by the dotted finger in Fig. 2, merely by depressing the inner or top leg 12 of the clamp to the Fig. 3 closed and locked position. To reestablish the flow at the identical rate as previously set, the operator or attendant need only apply an outward thrust against the upstanding nose 25, as indicated by the dotted thumb in Fig. 3. The clamp end wall 20 is thus readily sprung outward, toward the right in the figures, sufficiently to release the end 18 of the inner or top leg 12 from beneath the latch or locking detent 22 whereon it snaps back to seated engagement against the foot 32 of the regulating screw 30 then serving as an abutment or limiting stop. Flow accordingly is resumed at precisely the same rate as formerly in Fig. 2.

Hence the clamp of the invention provides for instant emergency shut-off and also for immediate return to the selected flow rate. The threading for the screw 30 and on the screw-supporting flange 24 is such that the screw tends to retain any selected position of adjustment without the aid of a lock nut or the like, but such may be supplied if preferred. It will be understood that in any given size the valving clamp of the invention is applicable to flexible tubing of a considerable range in diameter. In any instance the total range of regulatory setting for the screw 30 is calculated to provide any desired flow rate for the corresponding tubing between a maximum substantially free flow and a minimum or controlled drip flow, together with instant complete shut-off. Should it be desired to retain a full shut-off condition over a substantial period of time, the regulating screw 30 may be turned fully down into contact with the top leg 12 so as to prevent snap release thereof.

My invention is not limited to the particular embodiment thereof illustrated and described herein, and I set forth its scope in my following claim:

I claim:

A valving clamp for flexible tubes, comprising a single resilient sheet-metal strip bent upon itself to provide an elongated V-form body having a flexure hinge at the closed end, oppositely inset portions forming opposed jaws at an intermediate portion of the body and inner and outer generally parallel legs extending lengthwise from the jaws to the end of the body distal from the closed end, the outer leg bent transversely toward and across the inner leg to provide an end wall and a reversely directed top wall encompassing the adjacent end of the inner leg, said transverse end wall positioned for resilient abutting contact at its inner face with the end face of said inner leg end, guide openings in said end wall and at the closed end of the body for passage of tubing lengthwise through the body and between the jaws, said reversely directed top wall having opposite the encompassed end of the inner leg a threaded bushing member with its axis at substantially a right angle to the inner leg, a finger-operable regulating screw received in said bushing member and engageable with the inner leg for shifting it toward and from the outer leg thereby adjustably to set the jaws about the hinge thereof and correspondingly to compress an interposed tubing to afford a selected flow rate therein, said transverse end wall opening including a portion located opposite to the position of the end face of the inner leg corresponding to maximum closure of the jaws and maximum compression of the tubing to a fully shut-off status, said opening portion adapted to receive the end of the inner leg and permitting the transverse end wall to snap over it as said inner leg end is moved in sliding abutting contact with the inner face of said end wall until riding off into the opening portion, the overlying edge of said opening portion providing a releasable latch maintaining the clamp in the maximum shut-off relation subject to automatic re-setting to the previous selected flow rate by mere longitudinal outward flexure of said transverse end wall of the outer leg adequately to clear the inner leg from the latch and permit it to spring open to the previous set position against the regulating screw.

JAMES W. JOHNSON.

REFERENCES CITED

The following references are of record in the file of this patent:

UNITED STATES PATENTS

| Number | Name | Date |
| --- | --- | --- |
| 823,068 | Mosley | June 12, 1906 |
| 1,695,280 | Gollomb | Dec. 18, 1928 |